United States Patent
Coutant et al.

[11] Patent Number: 5,997,425
[45] Date of Patent: Dec. 7, 1999

[54] DIFFERENTIAL STEER AND FINAL DRIVE CONFIGURATION

[75] Inventors: Alan R. Coutant, Hinckley; Steven A Daniel, Glenfield, both of United Kingdom

[73] Assignee: Caterpillar Inc., Peoria, Ill.

[21] Appl. No.: 09/216,298

[22] Filed: Dec. 18, 1998

[51] Int. Cl.⁶ .................................................. B62D 11/06
[52] U.S. Cl. ........................... 475/18; 475/23; 475/224; 475/225; 180/6.2
[58] Field of Search ...................... 475/18, 23, 72, 475/74, 224, 225; 180/6.2

[56] References Cited

U.S. PATENT DOCUMENTS

| | | | |
|---|---|---|---|
| 2,679,769 | 6/1954 | Parrett | 475/224 |
| 3,303,723 | 2/1967 | Ruff | 475/18 X |
| 3,362,257 | 1/1968 | Hungerford | 475/224 X |
| 3,684,178 | 8/1972 | Friedlander | 74/625 X |
| 4,216,840 | 8/1980 | Dick | 74/15.69 X |
| 4,335,796 | 6/1982 | Smith | 74/11 X |
| 4,489,623 | 12/1984 | Hakkenberg | 74/378 |
| 4,498,349 | 2/1985 | Nishihara | 74/5.2 |
| 5,004,060 | 4/1991 | Barbagli et al. | 475/23 X |
| 5,090,268 | 2/1992 | Peeters | 74/665 |
| 5,211,064 | 5/1993 | Betz et al. | 74/15.8 |
| 5,267,477 | 12/1993 | Irikura et al. | 74/15.6 |
| 5,507,704 | 4/1996 | Lasoen | 475/295 |
| 5,582,065 | 12/1996 | Roth et al. | 74/15.69 |

Primary Examiner—Sherry L. Estremsky
Attorney, Agent, or Firm—Calvin E. Glastetter

[57] ABSTRACT

A differential steer and final drive configuration for machines such as small tractors for agricultural and construction purposes and the like, which differential steer and final drive configuration allows passage of a power take-off (PTO) shaft beneath the differential steer mechanism and between the drive axles of the final drive mechanisms such that a PTO output member connected to the PTO shaft can be located on or in the vicinity of the machine front to rear centerline and the drive wheel axis.

13 Claims, 4 Drawing Sheets

DIFFERENTIAL STEER AND FINAL DRIVE CONFIGURATION

TECHNICAL FIELD

This invention relates generally to differential steer and final drive mechanisms for machines such as small tractors for agricultural and construction purposes and the like, and, more particularly, to a differential steer and final drive configuration that allows passage of a power take-off (PTO) shaft beneath the differential steer mechanism and between the drive axles of the final drive mechanisms such that a PTO output member connected to the PTO shaft can be located on or in the vicinity of the machine front to rear centerline and the drive wheel axis.

BACKGROUND ART

Differential steer, that is, the ability to steer a machine, such as a tractor or the like, by supplying power to a drive wheel or track on one side of the machine, while applying a brake and/or supplying lesser or no power to a drive wheel or track on the opposite side of the tractor, is a well known operational feature used in both wheeled and tracked machines such as bulldozers and farm tractors. Similarly, a PTO unit, typically comprised of a rotatably powered auxiliary shaft having an output member to which implements or devices such as pumps, augers, mowers, cutters, and the like can be coupled to receive power, is also a well known feature. A PTO unit is often provided in association with a drawbar of a hitch for attaching the implement or device to be powered to the machine for towing purposes, the output end of the PTO unit typically being located at a known fore to aft distance and height above the drawbar to standardize attachment. For tractors and other machines that do not utilize differential steer, and also larger machines that do utilize differential steer, such as large agricultural tractors, surface mining equipment and the like, positioning the PTO output at the desired location and routing the PTO shaft or other power transmission member thereto is not problematic, as ample space for passage of the shaft or other member is typically available, due either to the absence of a differential steer mechanism, or to the larger size of the machine and correspondingly large spaces available for the passage of PTO shafts and the like. For smaller machines, on the other hand, particularly small tracked or wheeled tractors for agricultural and construction purposes utilizing differential steer, placement of the PTO output and routing power transmission equipment thereto, particularly a PTO shaft, can be a problem, due to the presence of a differential steer mechanism, and/or the smaller spaces around and through the final drive mechanism or mechanisms available for passage of the PTO shaft. Reference, Smith, U.S. Pat. No. 4,335,796, issued Jun. 22, 1982 to Deere & Company, which discloses a PTO rear mounting arrangement wherein the PTO output is desirably positioned, but which requires mounting the PTO shaft atop the transverse axle casing containing the drive differential, and locating the PTO transmission rearward thereof.

An alternative possible location for passage of the PTO shaft is beneath the final drive axle casing. However, this location can be disadvantageous if it results in sufficiently small ground clearance such that the shaft or part of the PTO assembly can strike and damage the tops of crops over which it passes. This problem may arise, for instance, when the PTO shaft is located on or in the vicinity of the tractor fore to aft centerline and the crops are planted in rows spaced 15 inches apart such that a crop row is located under or in close proximity to the fore to aft centerline as the tractor moves along the rows.

Accordingly, the present invention is directed to overcoming one or more of the problems as set forth above.

DISCLOSURE OF THE INVENTION

In one aspect of the present invention, a differential steer and final drive assembly for a machine such as a small agricultural or construction tractor or the like is disclosed, the differential steer and final drive assembly including a casing having first and second opposite end portions, the first end portion containing a transversely extending differential steer mechanism including a transmission input member adapted for connection in driven communication with the machine transmission, a steering input member adapted for connection in driven communication with an operator operable steering mechanism, and first and second geared differential output shafts in differentially driven communication with the transmission and steering input members, the second end portion of the casing having opposite side portions containing first and second final drive mechanisms, respectively, each final drive mechanism including a transversely extending geared input shaft meshed in driven communication with one of the differential output shafts and a transversely extending geared final drive axle in driven communication with the geared input shaft, each final drive axle having an outboard end adapted for attachment of a drive wheel assembly thereto and an opposite inboard end, the final drive axles being coaxial and the inboard ends thereof being located in spaced opposed relation to allow the passage of a PTO shaft therebetween. The present differential steer and final drive assembly can be mounted with the differential steer mechanism located at an elevated location relative to the final drive axles, such that the PTO shaft can extend beneath the differential steer mechanism and between the final drive axles along or in the vicinity of the machine front to rear centerline, such that the PTO output can be located in a desired standardized relation to a drawbar of a hitch mounted to the machine.

According to a preferred embodiment, the transversely extending differential steer mechanism utilizes at least one planetary gear set in cooperation with independently operator operable brake mechanisms for controlling rotation of the respective differential output shafts and thus the final drive mechanisms. According to another preferred embodiment, the geared input shafts of the final drive mechanisms each include a large bull gear meshed with one of the geared differential output shafts, and a smaller gear meshed with the larger final drive gear on the respective final drive axle for providing a double gear reduction for a high torque output capability.

BRIEF DESCRIPTION OF DRAWINGS

For a better understanding of the present invention, reference may be made to the accompanying drawings in which.

BEST MODE FOR CARRYING OUT THE INVENTION

Figure 1:
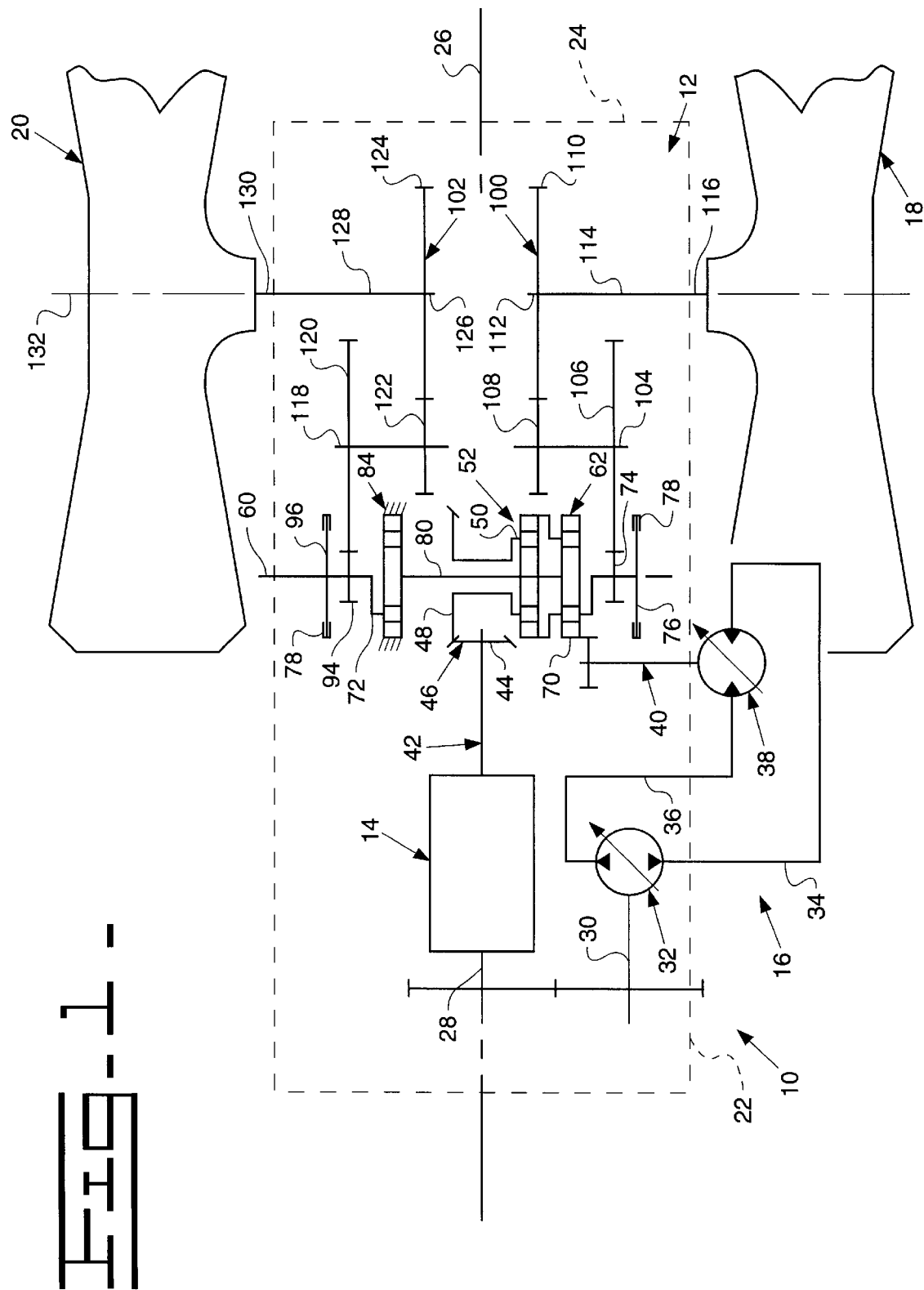
FIG. 1 is a diagrammatic representation of a machine including a differential steer and final drive assembly according to the present invention.

Referring now to the drawings, wherein a preferred embodiment of the present invention is shown, FIG. 1 is a diagrammatic representation of a machine 10 including a differential steer and final drive assembly 12 constructed and operable in accordance with the teachings of the present invention. The differential steer and final drive assembly 12 is contained substantially within a casing 134 (FIGS. 3 and 4) and is operably connected in driven communication with a transmission 14 and an operator operable hydrostatic steering mechanism 16 of machine 10, and operably connected in driving communication with a first drive wheel 18 and a second drive wheel 20 of machine 10. Here, it should be noted that machine 10 is intended to be representative of a wide variety of machines including, but not limited to, small agricultural and construction tractors, and, accordingly, drive wheel 18 and drive wheel 20 are intended to be representative of a wide variety of drive wheels for both wheeled and tracked machines. Transmission 14 and steering mechanism 16 are adapted to be connected in driven communication with an engine (not shown) of machine 10 for receiving motive power in the conventional manner, a PTO assembly 136 (FIGS. 3 and 4) and other engine powered accessories (not shown) being likewise connectable in driven communication with the engine in the conventional manner. Machine 10 furthermore generally includes a forward end portion 22, an opposite rear end portion 24, and a longitudinal centerline 26 extending therebetween.

Here it should be noted that transmission 14 is shown in FIG. 1 at a forward location on centerline 26 of machine 10, but could likewise be located elsewhere on the machine, as desired. Transmission 14 is operator controllable in the conventional manner and includes a forwardly located first geared input shaft 28 meshed in driving communication with a geared steering pump input shaft 30 of a steering pump 32 of hydrostatic steering mechanism 16. Hydrostatic steering mechanism 16 includes pump 32, a hydraulic line 34 and a hydraulic line 36 connecting pump 32 to a steering motor 38, and a geared output shaft 40 driven by steering motor 38 and meshed with a ring gear 70 of differential steer and final drive assembly 12 for providing steering inputs thereto, as will be explained hereinbelow. Transmission 14 further includes a rearwardly located output shaft 42 connected in driving communication to an input pinion gear 44 of a differential steer mechanism 46 of differential steer and final drive assembly 12.

Figure 2:
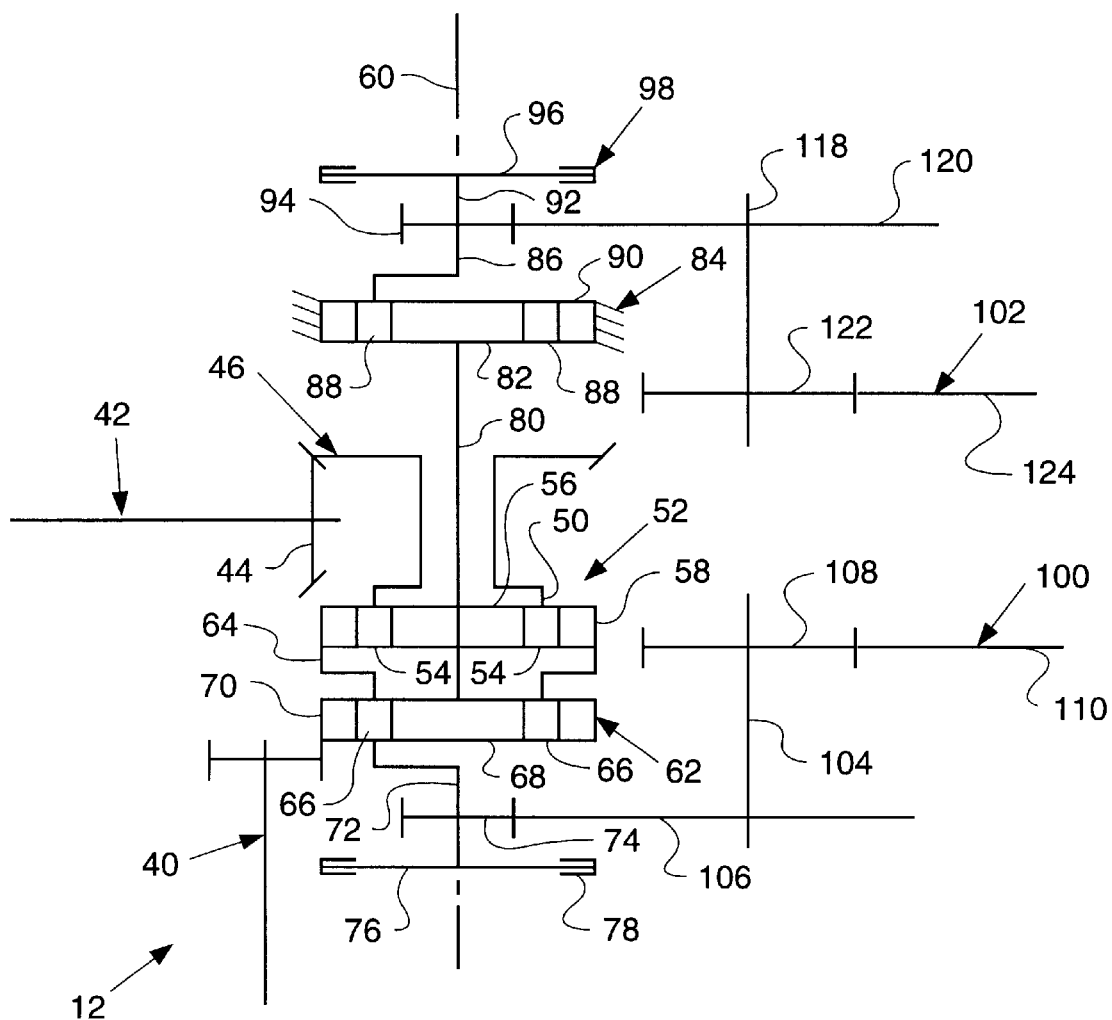
FIG. 2 is an enlarged diagrammatic representation showing the differential steer mechanism of the differential steer and final drive assembly of FIG. 1.

Referring also to FIG. 2 which shows differential steer mechanism 46 more particularly, differential steer mechanism 46 includes an input bevel gear 48 meshed in driven communication with input pinion gear 44, input bevel gear 48 being mounted for rotation with an input carrier 50 of a first planetary gear set 52. First planetary gear set 52 also includes a plurality of planet gears 54 mounted for rotation on input carrier 50 and meshed with a sun gear 56 and a ring gear 58, input bevel gear 48, input carrier 50, sun gear 56 and ring gear 58 being concentric about an axis 60 extending transversely with respect to centerline 26 through differential steer mechanism 46.

Differential steer mechanism 46 further includes a second planetary gear set 62 which includes a carrier 64 connected for rotation with ring gear 58 of first planetary gear set 52, a plurality of planet gears 66 mounted for rotation on carrier 64, planet gears 66 being meshed with a sun gear 68 and the ring gear 70. Ring gear 70 is also meshed in driven communication with geared steering motor output shaft 40 as noted above. Carrier 64 further includes a central hub shaft 72 carrying a first differential output gear 74 and a brake rotor 76 for rotation therewith, brake rotor 76 being a part of a first brake mechanism 78 operable by an operator to selectably slow or stop rotation of first differential output gear 74, as will be hereinafter explained. Sun gear 56 of first planetary gear set 52 and sun gear 68 of second planetary gear set 62 are both mounted for rotation with a transversely extending transfer shaft 80 which extends through a cavity through input carrier 50 and supports for rotation a sun gear 82 of a third planetary gear set 84. Third planetary gear set 84 further includes a carrier 86 rotatably supporting a plurality of planet gears 88 meshed with sun gear 82 and a fixed, non-rotatable ring gear 90. Furthermore, carrier 86 includes a central hub shaft 92 carrying a second differential output gear 94 and a brake rotor 96 for rotation therewith, brake rotor 96 being part of a second brake mechanism 98 operable by an operator for selectably slowing or stopping rotation of second differential output gear 94. Transfer shaft 80, sun gear 82, carrier 86, ring gear 90, central hub shaft 92, second differential output gear 94 and brake rotor 96 are all coaxial about axis 60.

Differential steer and final drive assembly 12 further includes a final drive mechanism 100 and a final drive mechanism 102 connected in driven communication with first differential output gear 74 and second differential output gear 94 of differential steer mechanism 46, respectively. More particularly, as best shown in FIG. 1, final drive mechanism 100 includes a transversely extending input shaft 104 carrying a first bull gear 106 and a smaller second gear 108, bull gear 106 being meshed in driven communication with first differential output gear 74 of differential steer mechanism 46. Second gear 108, in turn, is meshed in driving relation with a final drive gear 110 mounted adjacent an inboard end 112 of a transversely extending first final drive axle 114 for rotation therewith. First final drive axle 114 further includes an outboard end 116 to which first drive wheel 18 is mounted in the conventional manner.

Similarly, still referring more particularly to FIG. 1, second final drive mechanism 102 includes a transversely extending input shaft 118 carrying a second bull gear 120 and a smaller gear 122 for rotation therewith, second bull gear 120 being meshed in driven communication with second differential output gear 94, and smaller gear 122 being meshed in driving communication with a final drive gear 124 mounted adjacent an inboard end 126 of a transversely extending second transverse final drive axle 128. Final drive axle 128 additionally includes an outboard end 130 having second drive wheel 20 mounted thereto for rotation therewith.

In operation, again referring to both FIG. 1 and FIG. 2, power transmitted to transmission 14 from the engine (not shown) to rotate output shaft 42 will impart rotation to input bevel gear 48 to thereby rotate input carrier 50 and planet gears 54 relative to sun gear 56 and ring gear 58 of first planetary gear set 52. Then, depending on whether ring gear 70 of second planetary gear set 62 is being rotated by hydrostatic steering mechanism 16 through the meshed relationship with geared steering motor output shaft 40, and the direction of such rotation, and whether first brake mechanism 78 is applied, first differential output gear 74 will be rotated to impart rotation to first drive wheel 18 through first final drive mechanism 100. Similarly, the rotation imparted to planet gears 54 through input carrier 50 and the rotational inputs received (if any) from steering motor output shaft 40 of steering mechanism 16, will cause rotation of sun gear 56 and sun gear 68 to rotate transfer shaft 80 and sun gear 82 of third planetary gear set 84, rotation of second differential output gear 94 and resultant rotation of second final drive mechanism 102 being determined by whether second brake 98 is applied or not. Thus, by varying rotational power inputs to differential steer and final drive assembly 12 through transmission 14, steering inputs through steering mechanism 16, and braking inputs through first brake mechanism 78 and second brake mechanism 98, first and second drive wheels 18 and 20 can be differentially rotated to steer machine 10.

Referring again to FIG. 1, importantly, first final drive axle 114 and second final drive axle 128 are coaxial about a transversely extending axis 132, and inboard end 112 of first final drive axle 114 and inboard end 126 of final drive axle 128 are located in spaced, opposed relation on opposite sides of longitudinal centerline 26 of machine 10, to allow passage of a PTO assembly such as the PTO assembly 136 (FIGS. 3 and 4) between first final drive mechanism 100 and second final drive mechanism 102.

Figure 3:
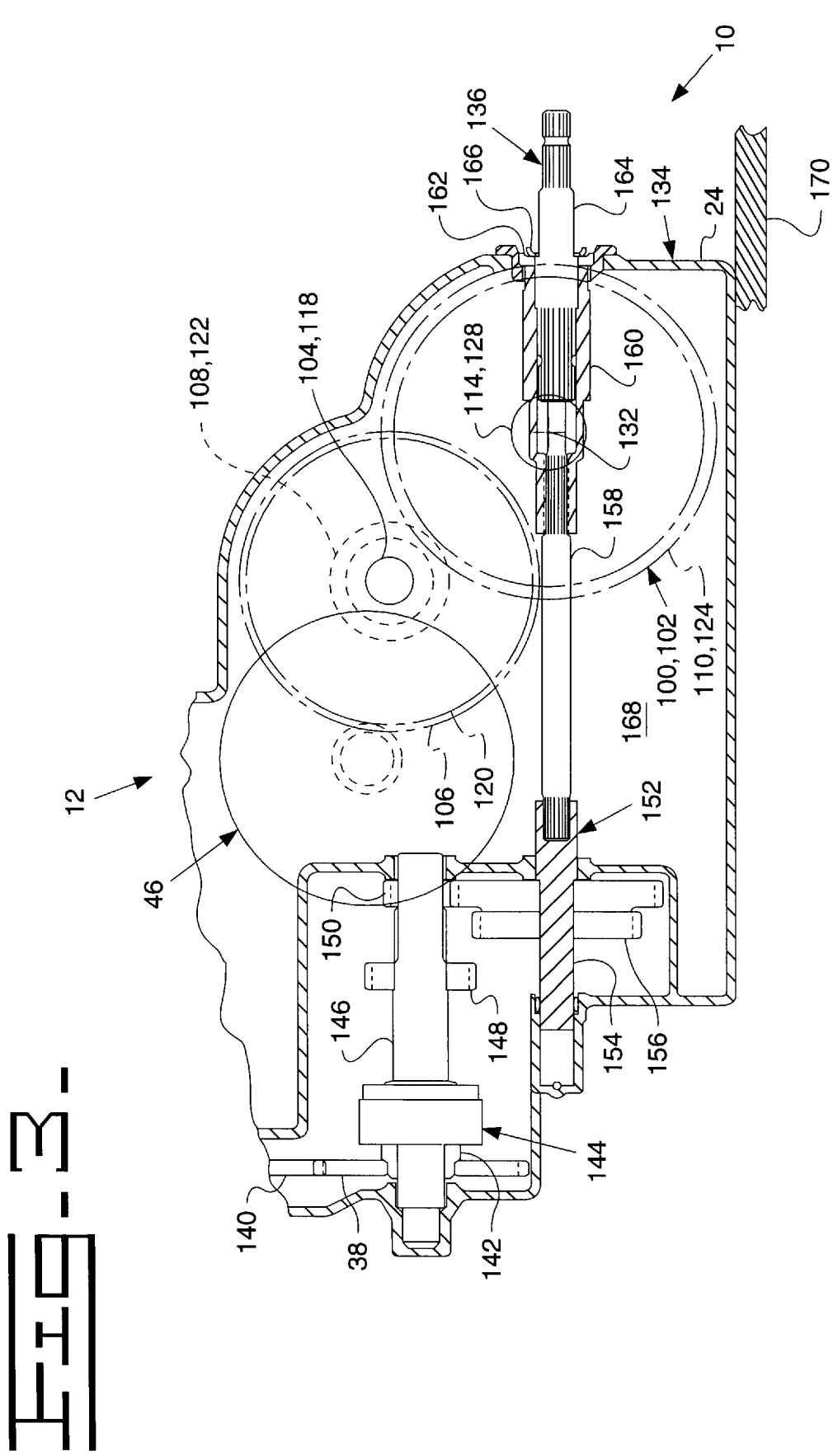
FIG. 3 is a fragmentary partial cross-sectional view of the machine of FIG. 1, including a diagrammatic representation of the differential steer and final drive assembly, and showing in partial cross-section a PTO assembly in association therewith.

Turning to FIG. 3 to illustrate this important capability, a side view of rear end portion 24 of machine 10 is shown, including a casing 134 enclosing and supporting differential steer and final drive assembly 12 and an optional PTO assembly 136. PTO assembly 136 includes an input gear 138 meshed in driven communication with a gear 140, which gear 140 is in driven communication with the machine engine (not shown). Input gear 138 is mounted to a hub 142 of a clutch 144, clutch 144 being engageable to drivingly communicate input gear 138 with a PTO input shaft 146, PTO input shaft 146 having a high speed gear 148 and a low speed gear 150 mounted thereon for rotation therewith. PTO assembly 136 further includes a PTO output shaft assembly 152 having a forward end portion 154 including a high speed and low speed gear set 156 mounted thereon for rotation therewith and selectably engageable with high speed gear 148 and low speed gear 150 on PTO input shaft 146 for allowing changing the rotational speed of PTO output shaft assembly 152. PTO output shaft assembly 152 further includes a PTO output shaft 158 having a PTO output tube 160 mounted thereto, which output tube 160 extends through a rear opening 162 in casing 134. PTO output tube 160 is adapted for cooperatively receiving for rotation therewith a reversible PTO output adapter member 164 having opposite ends which can be inserted into PTO output tube 160 and retained in position therein with a retainer clip 166 or other member to allow connection of various implements in driven relation to the PTO output shaft 158. PTO adapter member 164, when inserted in PTO output tube 160, is also cooperatively engageable in abutment with the end of PTO output shaft 158 to move shaft 158 axially for moving gear set 156 between a high speed position in engagement with high speed gear 148 on input shaft 146 and a low speed position in engagement with low speed gear 150 to selectably effect high speed or low speed operation of PTO output shaft assembly 152.

More importantly, PTO output shaft 158 and PTO output tube 160 extend through a space 168 which extends beneath differential steer mechanism 46 and input shaft 104 of final drive mechanism 100 and input shaft 118 of final drive mechanism 102, and between inboard end 112 of final drive axle 114 (FIG. 4) and inboard end 126 of final drive axle 128 (FIG. 4) generally in the vicinity of drive axis 132 heightwise, such that PTO output tube 160 is positioned a desired standard distance above a hitch 170 mounted to and extending rearwardly from machine 10.

Figure 4:
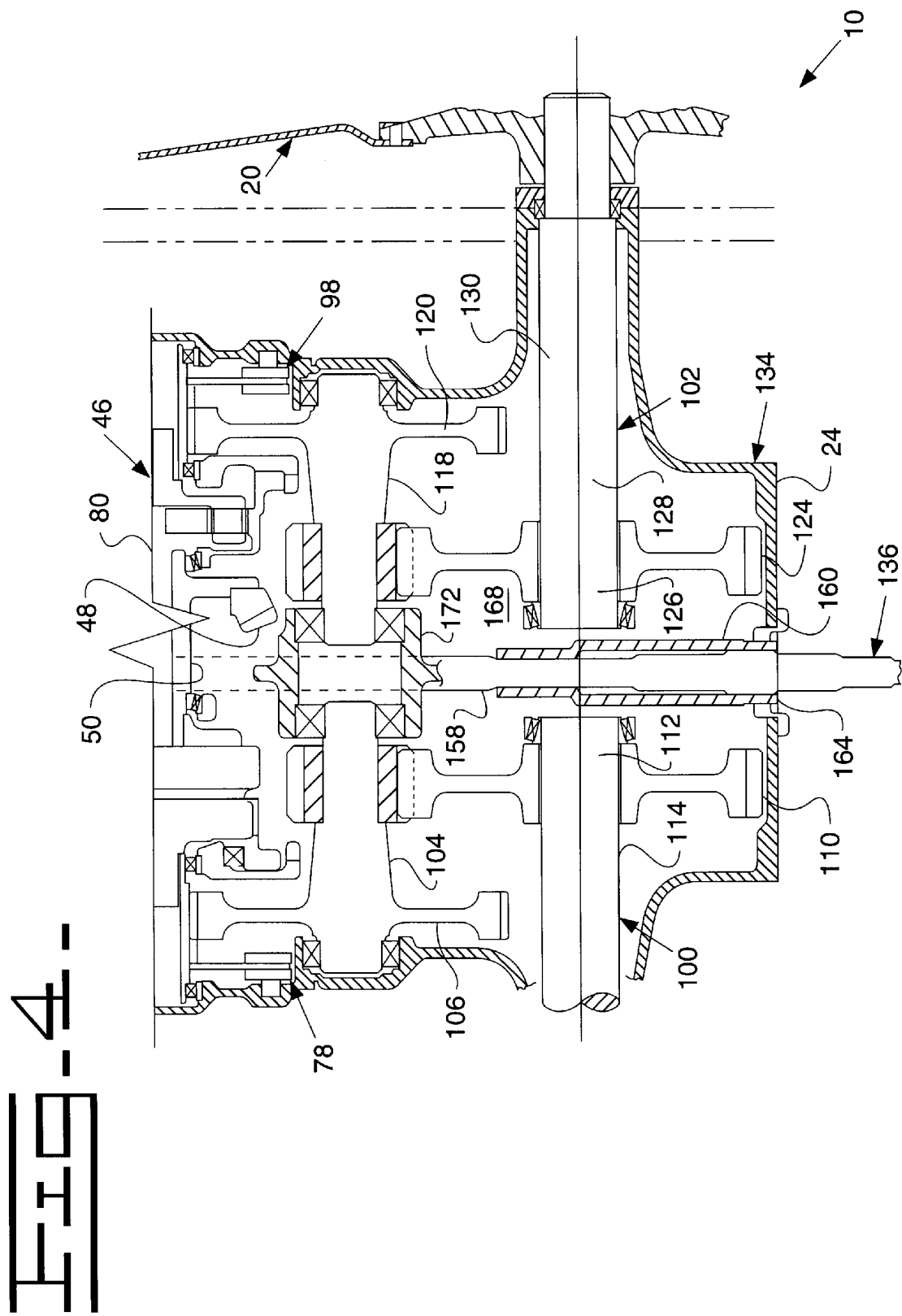
FIG. 4 is a fragmentary partial cross-sectional view of the machine of FIG. 1, showing the final drive mechanisms of the differential steer and final drive assembly and the PTO assembly of FIG. 3 in association therewith.

FIG. 4 is a top view of rear end portion 24 of machine 10 and casing 134 showing the passage of PTO output shaft 158 and PTO output tube 160 of PTO assembly 136 through space 168 beneath differential steer mechanism 46, including beneath input carrier 50 and transfer shaft 80 thereof, and also beneath a bearing housing 172 supporting the inboard end of input shaft 104 carrying bull gear 106 of final drive mechanism 100 and the inboard end of input shaft 118 carrying bull gear 120 of final drive mechanism 102, and between inboard end 112 of final drive axle 114 and inboard end 126 of final drive axle 128 as explained above. FIG. 4 also shows the location of input ring gear 48 of differential steer mechanism 46, brake mechanism 78, brake mechanism 98, final drive gear 110 of final drive mechanism 100, and final drive gear 124 of final drive mechanism 102, along with second drive wheel 20 on outboard end 130 of final drive axle 128.

Industrial Applicability

The present differential steer and final drive assembly configuration is compactly and efficiently packaged to allow passage of a PTO shaft beneath the differential steer mechanism and between the final drive axles to allow placement of the PTO output in desired relation to a hitch for attachment of implements thereto, so as to be ideally suited for smaller machine applications. Other aspects, objects and advantages of the present invention can be obtained from a study of the drawings, the disclosure and the appended claims.

We claim:

1. A differential steer and final drive assembly comprising:
    a casing having a first end portion and an opposite second end portion, the first end portion containing a transversely extending differential steer mechanism including a transmission input member adapted for connection in driven communication with a transmission, a steering input member adapted for connection in driven communication with a steering mechanism, and a first geared differential output shaft and a second geared differential output shaft in differentially driven communication with the transmission input member and the steering input member,
    the second end portion of the casing having opposite side portions containing a first final drive mechanism and a second final drive mechanism, respectively, each final drive mechanism including a transversely extending geared input shaft meshed in driven communication with one of the differential output shafts and a transversely extending geared final drive axle in driven communication with the geared input shaft thereof, each final drive axle having an outboard end adapted for attachment of a drive wheel assembly thereto and an opposite inboard end, the transverse final drive axles being coaxial and the inboard ends thereof being located in spaced opposed relation to allow passage of a PTO shaft therebetween.

2. The differential steer and final drive assembly, as set forth in claim 1, wherein the transversely extending differential steer mechanism further comprises at least one planetary gear set operable in cooperation with an operator operable brake mechanism for differentially driving the first and second geared differential output shafts.

3. The differential steer and final drive assembly, as set forth in claim 1, wherein each final drive mechanism comprises a double reduction gear arrangement wherein the transversely extending geared input shaft thereof includes a larger bull gear meshed in driven communication with said one of the geared differential output shafts, and a smaller gear, and the transversely extending final drive axle thereof includes a larger final drive gear meshed in driven communication with the smaller gear.

4. The differential steer and final drive assembly, as set forth in claim 1, wherein the casing is mountable on a machine with the first end portion containing the transversely extending differential steer mechanism located at a forward elevated position relative to the second end portion containing the final drive axles so as to provide a space beneath the differential steer mechanism in communication with the space between the final drive axles for the passage of the PTO shaft therethrough.

5. The differential steer and final drive assembly, as set forth in claim 4, wherein the casing contains the space beneath the differential steer mechanism.

6. The differential steer and final drive assembly, as set forth in claim 5, wherein the casing contains at least a substantial portion of the PTO shaft.

7. A differential steer and final drive assembly for a machine having an engine, a transmission having an output member in driven communication with the engine, and a steering mechanism having an output member in driven communication with the engine, said differential steer and final drive assembly comprising:

a casing having a forward end portion, an opposite rear end portion and a longitudinal centerline extending therebetween;

a differential steer mechanism located in the forward end portion of the casing, the differential steer mechanism having a first geared input member adapted for connection in driven communication with the transmission output member and a second geared input member adapted for connection in driven communication with the steering mechanism output member, the differential steer mechanism further including a first geared differential output shaft, a second geared differential output shaft, and a plurality of transversely extending geared shafts meshed with the first and second geared input members and the first and second geared differential output shafts for differentially driving the first and second differential output shafts based in part on drive inputs received from the transmission output member and in part on drive inputs received from the steering mechanism output member, a first final drive mechanism located in the rear end portion of the casing on one side of the longitudinal centerline, the first final drive mechanism having a geared transversely extending input shaft meshed in driven communication with the first geared differential output shaft, and a first transversely extending geared final drive axle meshed in driven communication with the first geared input shaft; and a second final drive mechanism located in the rear end portion of the casing on an opposite side of the longitudinal centerline from the first final drive mechanism, the second final drive mechanism having a second transversely extending geared input shaft meshed in driven communication with the second geared differential output shaft, and a second transversely extending geared final drive axle meshed in driven communication with the second geared input shaft, wherein the first and second transversely extending geared drive axles are coaxial and have inboard ends located in spaced opposed relation on opposite sides of the longitudinal centerline so as to be adapted for accommodating a longitudinally extending PTO shaft therebetween.

8. The differential steer and final drive assembly, as set forth in claim 7, wherein each final drive mechanism comprises a double reduction gear arrangement wherein the transversely extending geared input shaft thereof includes a larger bull gear meshed in driven communication with said one of the geared differential output shafts, and a smaller gear, and the transversely extending final drive axle includes a larger final drive gear meshed in driven communication with the smaller gear.

9. The differential steer and final drive assembly, as set forth in claim 7, wherein the casing is adapted to be mounted to the machine with the forward end portion containing the differential steer mechanism located at an elevated position relative to the drive axles so as to accommodate the PTO shaft beneath the differential steer mechanism.

10. The differential steer and final drive assembly, as set forth in claim 9, wherein the casing contains a substantial portion of the PTO shaft.

11. The differential steer and final drive assembly, as set forth in claim 10, wherein the PTO shaft has an output member extending rearwardly from the casing.

12. A small machine comprising:

an engine;

a transmission having an output member in driven communication with the engine;

a steering mechanism having an output member in driven communication with the engine;

a differential steer and final drive assembly including a casing having a forward end portion, an opposite rear end portion and a longitudinal centerline extending therebetween, a differential steer mechanism located in the forward end portion of the casing, the differential steer mechanism having a first geared input member connected in driven communication with the transmission output member, a second geared input member connected in driven communication with the steering mechanism output member, a first geared differential output shaft, a second geared differential output shaft, and a plurality of transversely extending geared shafts meshed with the first and second geared input members and the first and second geared differential output shafts for differentially driving the first and second differential output shafts based in part on drive inputs received from the transmission output member and in part on drive inputs received from the steering mechanism output member, a first final drive mechanism located in the rear end portion of the casing on one side of the longitudinal centerline, the first final drive mechanism having a geared transversely extending input shaft meshed in driven communication with the first geared differential output shaft, and a first transversely extending geared drive axle meshed in driven communication with the first geared input shaft;

a second final drive mechanism located in the rear end portion of the casing on an opposite side of the longitudinal centerline from the first final drive mechanism, the second final drive mechanism having a second transversely extending geared input shaft meshed in driven communication with the second geared differential output shaft, and a second transversely extending geared drive axle meshed in driven communication with the second geared input shaft, the first and second transversely extending geared drive axles being coaxial and having outboard ends including drive wheels mounted thereto and inboard ends located in spaced opposed relation on opposite sides of the centerline, and;

a PTO assembly including an input member connected in driven communication with the engine, a shaft connected in driven communication with the input member extending longitudinally beneath the differential steer mechanism and generally between the first and second drive axles.

13. The machine, as set forth in claim 12, wherein each final drive mechanism comprises a double reduction gear arrangement.

* * * * *